United States Patent
Saga

(10) Patent No.: US 9,981,495 B2
(45) Date of Patent: *May 29, 2018

(54) PRINTER THAT PERFORMS SHADING CORRECTION AND METHOD FOR OPERATING THE SAME

(71) Applicant: TOSHIBA TEC KABUSHIKI KAISHA, Tokyo (JP)

(72) Inventor: Kengo Saga, Mishima Shizuoka (JP)

(73) Assignee: Toshiba TEC Kabushiki Kaisha, Tokyo (JP)

(*) Notice: Subject to any disclaimer, the term of this patent is extended or adjusted under 35 U.S.C. 154(b) by 0 days. days.

This patent is subject to a terminal disclaimer.

(21) Appl. No.: 15/389,287

(22) Filed: Dec. 22, 2016

(65) Prior Publication Data

US 2017/0100951 A1    Apr. 13, 2017

Related U.S. Application Data

(63) Continuation of application No. 14/796,680, filed on Jul. 10, 2015, now Pat. No. 9,591,179.

(51) Int. Cl.
*B41J 29/38* (2006.01)

(52) U.S. Cl.
CPC .................................. *B41J 29/38* (2013.01)

(58) Field of Classification Search
CPC . B41J 29/393; B41J 2/32; B41J 2/471; G03G 2215/00177; H04N 1/6033; H04N 1/00002; H04N 1/00015; H04N 1/00031
See application file for complete search history.

(56) References Cited

U.S. PATENT DOCUMENTS

2008/0180514 A1* 7/2008 Sekizawa ............. G03G 15/043
                                                         347/252
2015/0347063 A1    12/2015 Saga

FOREIGN PATENT DOCUMENTS

JP          H07-046403 A      2/1995

* cited by examiner

*Primary Examiner* — Thinh H Nguyen
(74) *Attorney, Agent, or Firm* — Patterson & Sheridan, LLP

(57) ABSTRACT

A printer includes a discharge unit, a first printing unit disposed along a sheet conveying path extending from the discharge unit and configured to print an image on a first sheet while the first sheet is conveyed from the discharge unit to the first printing unit and then to the discharge unit, a second printing unit disposed farther from the discharge unit than the first printing unit along the sheet conveyance path and configured to print an image on a second sheet while the second sheet is conveyed towards the discharge unit therethrough, a scanning unit disposed along the sheet conveying path between the discharge unit and the first printing unit, and configured to scan a surface of the first sheet, and a control unit configured to perform a shading correction of the scanning unit using the second sheet as a white reference.

20 Claims, 5 Drawing Sheets

PRINTER THAT PERFORMS SHADING CORRECTION AND METHOD FOR OPERATING THE SAME

CROSS-REFERENCE TO RELATED APPLICATION

This application is a continuation of U.S. patent application Ser. No. 14/796,680, filed on Jul. 10, 2015. The entire contents of which are incorporated herein by reference.

FIELD

Embodiments described herein relate generally to a printer that performs shading correction and a method for operating the same.

BACKGROUND

Currently, a printer is used in financial institutions for printing images on a booklet such as a bankbook and a ledger sheet such as a bank statement. Typically, a dot printer is used to print images on the booklet. The booklet is inserted into the dot printer by a user and the printing is performed thereon. On the other hand, a thermal printer is typically used to print the ledger sheet, and a sheet stored in the thermal printer is used to print the ledger sheet. One type of a printer has both a dot printing unit and a thermal printing unit, and has a single sheet conveyance path that is shared by the dot printing unit and the thermal printing unit to make the printer smaller. Another type of a printer that prints images on the booklet has a scanner (image sensor) that scans a surface of the booklet, for example to detect the page number of a sheet of the booklet on which the printing is performed.

Generally, in order to properly detect an image on a scanned surface of a sheet, a scanner needs to periodically perform a shading correction. Usually, a reference plate is used to reset detection values for white during the shading correction. However, the reference plate may become an obstacle to making the size of the printer small.

DETAILED DESCRIPTION

One or more embodiments provide a printer in which shading correction is performed automatically, without using a separate white reference board prepared for the shading correction by a user.

In general, according to one embodiment, a printer includes a discharge unit, a first printing unit disposed along a sheet conveying path extending from the discharge unit and configured to print an image on a first sheet while the first sheet is conveyed from the discharge unit to the first printing unit and then to the discharge unit, a second printing unit disposed farther from the discharge unit than the first printing unit along the sheet conveyance path and configured to print an image on a second sheet while the second sheet is conveyed towards the discharge unit therethrough, a scanning unit disposed along the sheet conveying path between the discharge unit and the first printing unit, and configured to scan a surface of the first sheet, and a control unit configured to perform a shading correction of the scanning unit using the second sheet as a white reference.

First Embodiment

Hereinafter, a printer according to a first embodiment will be described in detail with reference to the drawings.

Figure 1:
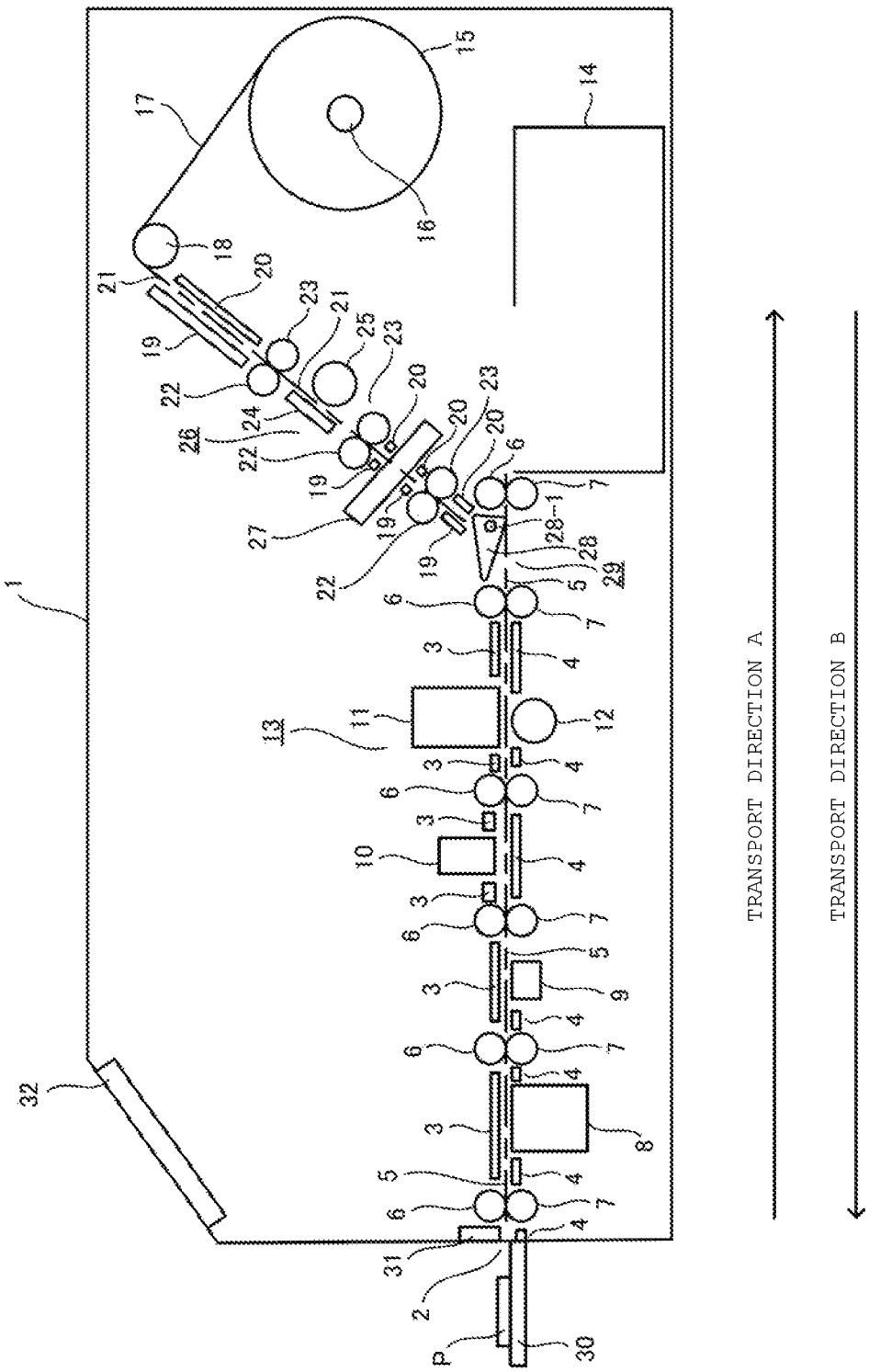
FIG. 1 illustrates main components of a printer according to a first embodiment.

FIG. 1 illustrates main components of the printer according to the first embodiment.

A multifunction printer 1 includes a plurality of printing mechanisms different from one another. According to the embodiment, in FIG. 1, the left side is referred to as a front side of the multifunction printer 1 and the right side is referred to as a rear side of the multifunction printer 1.

An insertion and discharge slit 2 is provided on the front side of the multifunction printer 1. Through the insertion and discharge slit 2, a booklet P such as a bankbook is inserted, or the booklet P on which printing is completed or roll paper 15 (described below), which is cut off as a ledger sheet after printing is completed is discharged to the outside of the multifunction printer 1. According to the embodiment, paper in a roll shape is described as the roll paper 15 and a sheet which is cut off after the necessary printing on the roll paper 15 is performed is described as a ledger sheet C.

A collection storage 14 is provided on the rear side of the multifunction printer 1 and collects and stores a booklet P or a ledger sheet C which a user forgets to take out.

A first upper transport guide 3 and a first lower transport guide 4 extend from the insertion and discharge slit 2 to the collection storage 14. A first paper transport path 5 is formed between the first upper transport guide 3 and the first lower transport guide 4, and the booklet P and the roll paper 15 are transported through the first paper transport path 5. According to the embodiment, a transport direction of the booklet P or the ledger sheet C from the insertion and discharge slit 2 to the collection storage 14 is described as a transport direction A. When there is not provided a specific description, in FIG. 1, the left side which is the front side, is described as an upstream side and the right side is described as a downstream side.

A feed roller 6 and an idler roller 7 are disposed to face each other on the downstream side of the insertion and discharge slit 2 in the transport direction A. The feed roller 6 is rotatable by a motor not illustrated and the idler roller 7 is disposed opposite to the feed roller 6 across the first paper transport path 5. These feed roller 6 and idler roller 7 are a pair, and the booklet P or the ledger sheet C is nipped therebetween and is transported therethrough. A plurality of pairs of the feed rollers 6 and the idler rollers 7 is provided along the first paper transport path 5.

In addition, an alignment unit 8 is provided on the downstream side of the insertion and discharge slit 2 in the transport direction A. The alignment unit 8 includes a paper sheet position detecting sensor, a shutter, a paper sheet pinch mechanism, an alignment side end wall (not illustrated) and corrects an orientation, a position, or the like, of the booklet P inserted from the insertion and discharge slit 2 so that the booklet P moves to a predetermined position and a predetermined orientation.

A magnetic stripe (MS) reading and writing unit 9 is provided on the downstream side of the alignment unit 8 in the transport direction A. The MS reading and writing unit 9 performs reading and writing of information from and in a magnetic stripe portion (not illustrated) which is provided on the rear surface of the booklet P.

A page line finder (PLF) 10 is provided on the downstream side of the MS reading and writing unit 9 in the transport direction A. The PLF 10 includes a CCD image sensor and the like and detects a page opened at the moment and a printed line on the page of the booklet P.

A dot head 11 and a platen roller 12 are disposed to face each other on the downstream side of the PLF 10 in the transport direction A. The platen roller 12 is disposed opposite to the dot head 11 across the first paper transport path 5. A first print unit 13 includes these dot head 11 and the platen roller 12 and performs printing on the booklet P.

The collection storage 14 is provided on the downstream side of the first print unit 13 in the transport direction A.

The roll paper 15, which is supported rotatably against a frame (not illustrated) and is paper wound around a winding shaft 16, is loaded on the rear side of the multifunction printer 1.

A heat-sensitive layer on which color appears by heating is formed only on a printing surface A17 of the roll paper 15.

In addition, in the multifunction printer 1, an idler roller 18 that imparts constant tension to the roll paper 15 is provided.

A second upper transport guide 19 and a second lower transport guide 20 extend from the idler roller 18 toward the front side of the multifunction printer 1. A second paper transport path 21 is formed between the second upper transport guide 19 and the second lower transport guide 20 and the roll paper 15 is transported through the second paper transport path 21. The second paper transport path 21 is joined to the first paper transport path 5 on the downstream side of the first print unit 13 in the transport direction A. According to the embodiment, a transport direction of the roll paper 15 or the ledger sheet C from the idler roller 18 toward the insertion and discharge slit 2 through a joining section 29, which is a joining position of the first paper transport path 5 with the second paper transport path 21, is described as a transport direction B.

A feed roller 22 and an idler roller 23 are disposed to face each other on the downstream side of the idler roller 18 in the transport direction B. The feed roller 22 is rotatable by a motor not illustrated and the idler roller 23 is disposed opposite to the feed roller 22 across the second paper transport path 21. These feed roller 22 and idler roller 23 are a pair, and the roll paper 15 is nipped therebetween and is transported therethrough. A plurality of pairs of the feed rollers 22 and the idler rollers 23 is provided along the second paper transport path 21.

A thermal print head 24 and a platen roller 25 are provided on the downstream side of the idler roller 18 in the transport direction B. The platen roller 25 is disposed opposite to the thermal print head 24 across the second paper transport path 21 and is rotatable by a motor not illustrated. A second print unit 26 includes these thermal print head 24 and the platen roller 25 and printing on the printing surface A17 of the roll paper 15 is performed at the second print unit 26.

A cutter 27 is disposed on the downstream side of the second print unit 26 in the transport direction B. The cutter 27 includes a stationary blade and a movable blade (both not illustrated) and cuts the roll paper 15 inserted into a slit (not illustrated) which is provided in the cutter 27 by causing the movable blade to slide to the stationary blade by driving a cutter motor not illustrated. Here, the cutter 27 is a so-called sliding-type cutter in which the movable blade slides to the stationary blade, but may not be limited thereto. The cutter 27 may be a so-called rotary-type cutter that cuts paper by causing the movable blade to rotate and to come in contact with the stationary blade.

The first paper transport path 5 and the second paper transport path 21 are joined with each other on the downstream side of the cutter 27 in the transport direction B. A flapper 28 is provided in the joining section 29, which is the joining position. The flapper 28 is rotatable about a flapper rotating shaft 28-1. When the flapper 28 is rotated counterclockwise, the second paper transport path 21 and the first paper transport path 5 communicate with each other. When the flapper 28 is rotated clockwise, the transport may be performed only through the first paper transport path 5 from the insertion and discharge slit 2 to the collection storage 14.

In addition, an insertion and discharge table 30 is provided in the vicinity of the insertion and discharge slit 2 on the front side of the multifunction printer 1. The insertion and discharge table 30 is used to temporarily support the booklet P or the ledger sheet C when the booklet P is inserted into the multifunction printer 1 and when the booklet P or the ledger sheet C is discharged therefrom. In addition, a collection sensor 31 that detects whether a user takes away the booklet P or the ledger sheet C discharged from the insertion and discharge slit 2. In addition, a display unit 32 that displays various states of the multifunction printer 1 including an error message indicating that a paper jam occurred or a running out of paper is provided on an upper surface of the multifunction printer 1.

Figure 2:
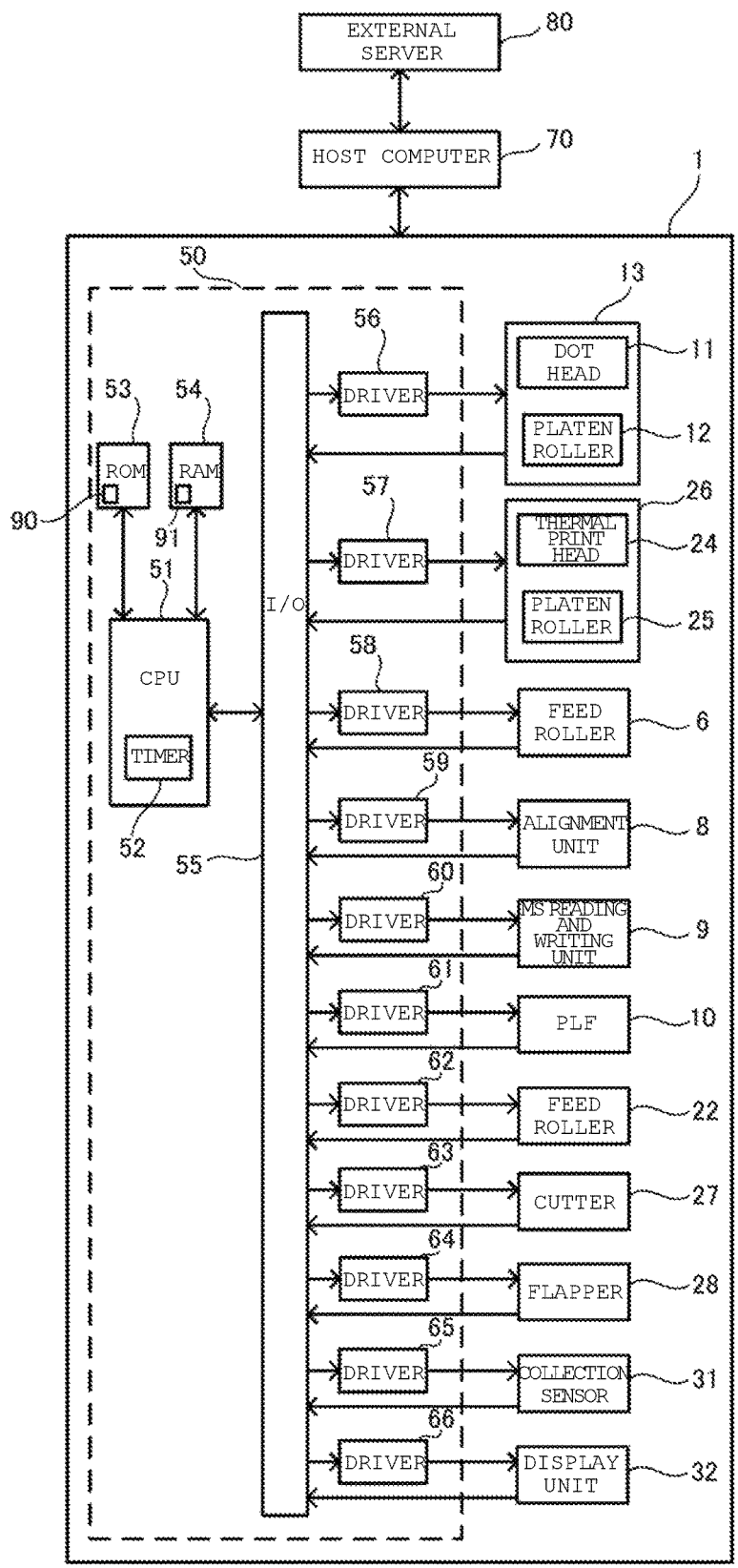
FIG. 2 is a block diagram of the printer according to the first embodiment.

FIG. 2 is a block diagram of a control circuit of the multifunction printer 1 according to the embodiment. The controller 50 performs control of transport of paper, printing, cutting of paper, discharge of a paper sheet, collection of a paper sheet, shading correction, and a display of a state of the multifunction printer 1.

The controller 50 performs communication with a host computer 70 and various types of control operations and includes a microcomputer. In addition, the host computer 70 is connected to an external server 80, such as the one located in a financial institution which manages savings information or the like.

A central processing unit (CPU) 51 of the controller 50 performs various types of control or arithmetic operations such as paper sheet transport control, printing control, paper sheet cutting control, paper sheet discharge control, and paper sheet collecting control in accordance with a program.

In addition, the CPU 51 includes a timer 52 as a unit that performs setting and control of time.

A ROM 53 and a RAM 54 are disposed, in the controller 50, as main memory units that store a control program that is executed by the CPU 51, data that is obtained during the control or arithmetic operation, or the like.

The ROM 53 is a read only memory that includes the control program, a table, or the like, and the RAM 54 is a random access memory that stores data that is obtained during the arithmetic operation, or the like.

A shading correction implementation condition portion 90, which holds a condition to execute shading correction of the PLF 10 (described below), is provided in the ROM 53. In addition, a shading target-counting portion 91 (described below), which holds how many days elapsed after a previous shading correction was carried out, is provided in the RAM 54.

An input/output unit (I/O) 55 is provided in the controller 50 and the I/O 55 performs gathering of various input data items from the host computer 70 and extraction of control output of the controller 50 to the host computer 70. The I/O 55 is connected to the CPU 51, the ROM 53, and the RAM 54 through a bus.

As units that extract the control output, first, second, third, fourth, fifth, sixth, seventh, eighth, ninth, tenth, and eleventh drivers 56, 57, 58, 59, 60, 61, 62, 63, 64, 65, and 66 are connected to the I/O 55.

The first driver 56 supplies a drive output to the first print unit 13. The second driver 57 supplies a drive output to the second print unit 26. The third driver 58 supplies a drive output to the feed roller 6. The fourth driver 59 supplies drive output to the alignment unit 8. The fifth driver 60 supplies a drive output to the MS reading and writing unit 9. The sixth driver 61 supplies a drive output to the PLF 10. The seventh driver 62 supplies a drive output to the feed roller 22. The eighth driver 63 supplies a drive signal to the cutter 27. The ninth driver 64 supplies a drive signal to the flapper 28. The tenth driver 65 supplies a drive output to the collection sensor 31. The eleventh driver 66 supplies a drive signal to the display unit 32.

Figure 3:
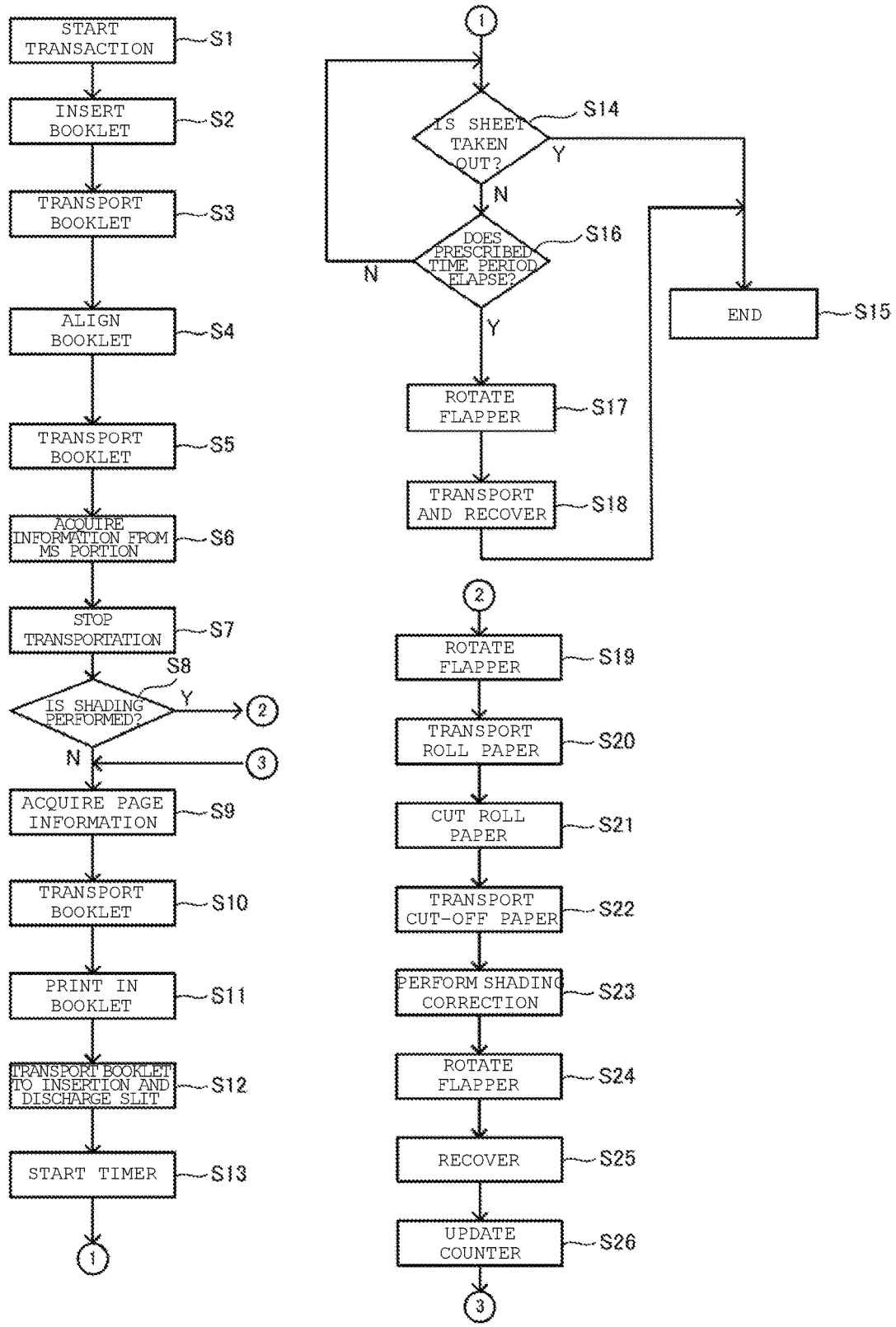
FIG. 3 is a flowchart of operations carried out when a booklet is used for printing in the printer according to the first embodiment.
Figure 4:
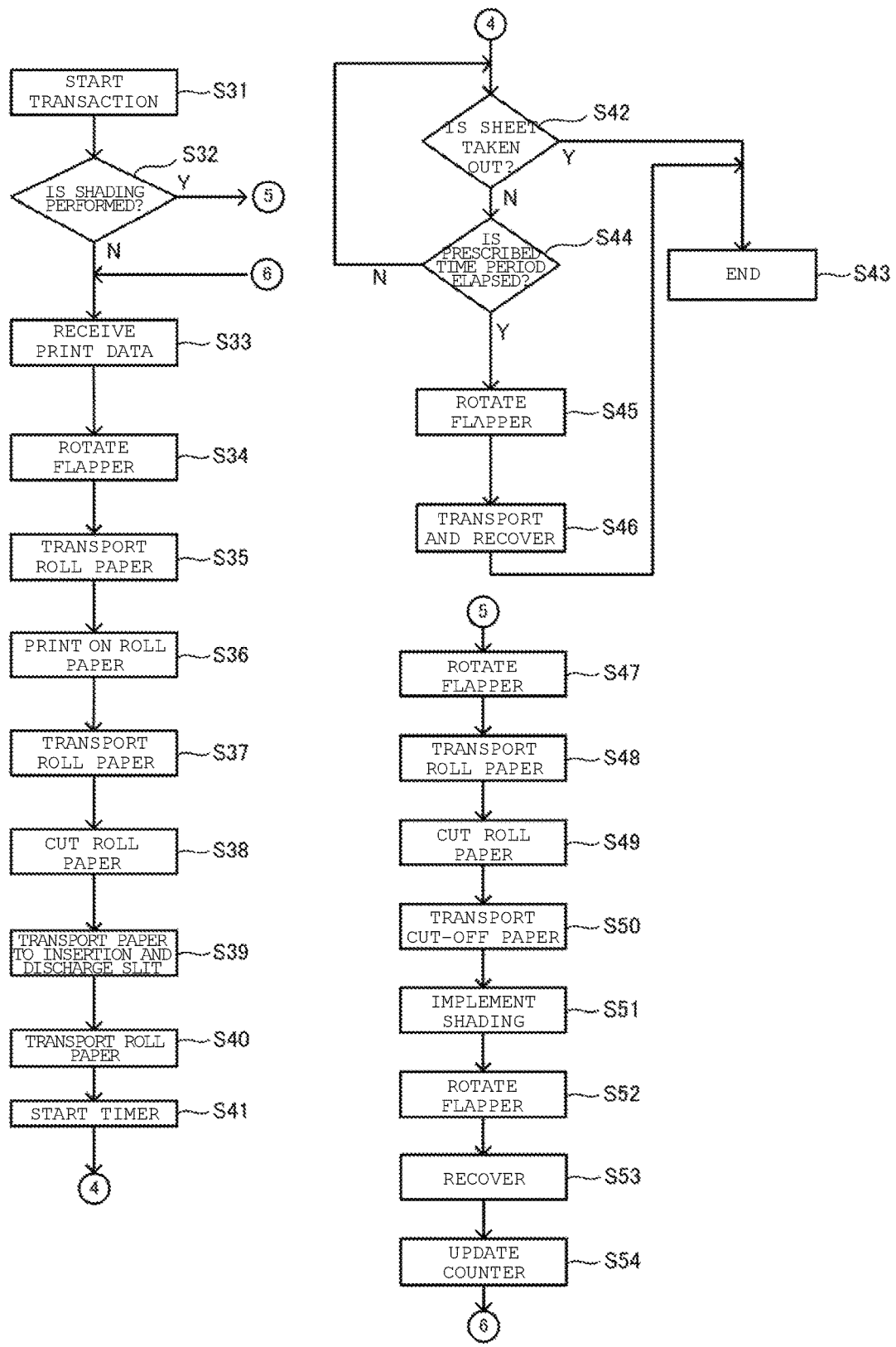
FIG. 4 is a flowchart of operations carried out when roll paper is used for printing in the printer according to the first embodiment.

Hereinafter, operation of the multifunction printer 1 is described with reference to FIG. 1 and FIGS. 3 and 4. The multifunction printer 1 is used in a state of being incorporated into an automatic teller machine or the like. Here, a bookkeeping operation of the multifunction printer 1 is described as an example.

A user presses a button to start bookkeeping through a screen (not illustrated) of the automatic teller machine (ATM) and starts transaction (S1). When the button for the bookkeeping implementation is pressed, the controller 50 operates to display an instruction to open and insert the booklet P, which is a bankbook, from the insertion and discharge slit 2 of the multifunction printer 1 on the display unit 32 for the user.

The user opens and inserts the booklet P from the insertion and discharge slit 2 in accordance with the instruction (S2). The multifunction printer 1 rotates the feed roller 6 and to transport the booklet P to the alignment unit 8 in cooperation with the idler roller 7 (S3). The alignment unit 8 corrects an orientation, a position, or the like, of the transported booklet P and the booklet P is aligned to a preset position and a preset orientation (S4). Since an alignment mechanism is a known mechanism, a detailed description thereof is omitted.

Then, the aligned booklet P is transported in the transport direction A in cooperation of the feed roller 6 with the idler roller 7 (S5). In a course of the transport, the MS reading and writing unit 9 is provided on the transport path of the first paper transport path 5. The MS portion (not illustrated) is provided on the rear surface of the booklet P. User information or the like is written as magnetic information in the MS portion of the booklet P. The controller 50 acquires the user information or the like from the MS portion using the MS reading and writing unit 9 during the transport of the booklet P and obtains user transaction information or the like from the external server 80 of financial institutions or the like (S6). Since an interchange of information between the external servers 80 of the financial institutions or the like is a known event, a detailed description thereof is omitted.

When the user transaction information is acquired using the MS reading and writing unit 9, the controller 50 stops the transport of the booklet P (S7). The stopping position is a position where the booklet P does not reach the position of the PLF 10.

Then, the controller 50 determines whether shading correction of the PLF 10 of the multifunction printer 1 is performed (S8). Whether to perform the shading correction is determined using a formula stored in the shading correction implementation condition portion 90 and data stored in the shading target-counting portion 91. According to the embodiment, the condition to perform the shading correction is set to every 100 days of operation of the multifunction printer 1 in the shading correction implementation condition portion 90. In addition, the shading target-counting portion 91 counts up the stored data by one each day of the operation. It is possible for the user to change the setting of the condition in advance, for example, such that the shading correction is performed once every month, every  hours of operation, or the like. Types of data stored in the shading target-counting portion 91 are changed depending on the condition set in the shading correction implementation condition portion 90**.

The controller 50 determines whether the shading correction is performed (S8). When 100 days do not elapse after the previous shading correction has been performed, the shading correction is determined to be not performed (N in S8), and thus the transport of the booklet P is performed.

The controller 50 acquires page information provided on the booklet P using the PLF 10 provided on the downstream side of the MS reading and writing unit 9 in the transport direction A during the transport of the booklet P (S9). As described above, the user transaction information has been already acquired by the controller 50. Information that contains in which page of the booklet P the bookkeeping is performed is included in the transaction information. The information is compared to a detected page acquired by the PLF 10. When another page that is not a proper page to perform the printing this time is opened and inserted, the controller 50 transports the booklet P in the transport direction B and provides an instruction that the user needs to reinsert the booklet with the right page of the booklet opened. When a booklet page turning mechanism unit (not illustrated) is provided in the multifunction printer 1, the booklet P is transported to the booklet page turning mechanism unit and turned over to the right page and then the booklet may be transported again to the position.

After the booklet P is transported to the first print unit 13 through the MS reading and writing unit 9 and the PLF 10 (S10), the printing is performed in the booklet P between the dot head 11 and the platen roller 12 (S11).

After the printing in the booklet P is completed, the controller 50 rotates the feed roller 6 such that the booklet P is transported in the transport direction B and the transport of the booklet P in cooperation with the idler roller 7 is stopped at a position where the booklet P is mounted on the insertion and discharge table 30 and a part of the booklet P protrudes from a front surface 33 to the outside of the multifunction printer 1 (S12).

The collection sensor 31, which is a transmission-type sensor, is provided in the insertion and discharge slit 2. When the booklet P is stopped at the position where the booklet P protrudes from the front surface 33 to the outside of the multifunction printer 1, the collection sensor 31 is capable of detecting whether the booklet P is present at the position.

When the transport of the booklet P is stopped at the position where the part of the booklet P protrudes from the front surface 33 to the outside of the multifunction printer 1, the collection sensor 31 detects that the booklet P is present at the position. When the detection is performed, the timer 52 is started to perform time measurement (S13) and a sensing signal of the collection sensor 31 represents ON. A set time that is measured by the timer 52 will be described below.

Then, the controller 50 determines whether or not the user takes back the booklet P every fixed time (S14). A detection signal of the collection sensor 31 is used to determine the check of whether the user takes back the booklet P. The signal of the collection sensor 31 is ON during the presence of the booklet P. However, when the user takes back the booklet P, the detection signal of the collection sensor 31 is OFF. The switching makes it possible to determine whether the user takes back the booklet P.

When the controller 50 determines that the user takes back the booklet P (Y in S14), the operation for the user ends (S15).

The controller 50 determines whether or not the user takes out the booklet P every fixed time (S14). When it is determined that the user does not take out the booklet P (N in S14), the controller 50 checks the period of time that has passed since the transport of the booklet P is stopped at the position where the part of the booklet P protrudes from the front surface 33 to the outside of the multifunction printer 1, and determines whether or not the passed time exceeds a prescribed time period (S16). Here, the prescribed time period is a period of time after which it may be determined that the user forgets to take out the booklet P and the period of time is from a state in which the transport of the booklet P is stopped at the position where the part of the booklet P protrudes from the front surface 33 to the outside of the multifunction printer 1, that is, a state in which it is possible for the user to take out the booklet P, to a certain time point after certain time elapses. The prescribed time period is, for example, 30 seconds which is set in advance.

When the prescribed time period does not elapse (N in S16), there is a possibility that the user takes out the booklet P. Thus, whether the booklet P is taken out is determined again (S14).

Whether the prescribed time period elapses is determined (S16). When the prescribed time period elapses (Y in S16), it is determined that there is a high possibility that the user forgets to take out the booklet P and the controller 50 first rotates the flapper 28 about the flapper rotating shaft 28-1 in the clockwise direction (S17). Accordingly, the first paper transport path 5 and the collection storage 14 are in a state of communicating with each other. Then, the controller 50 rotates the feed roller 6 such that the booklet P is transported in the transport direction A and the booklet P to be recovered in the collection storage 14 in cooperation with the idler roller 7 (S18) and the process ends (S15).

The controller 50 determines whether or not to perform the shading correction (S8). When 100 days elapse after the previous shading correction has been performed, the shading correction is determined to be performed (Y in S8). Thus, the flapper 28 is caused to rotate (S19), and the second paper transport path 21 and the first paper transport path 5 are turned into a state of communicating with each other. Then, the feed roller 22 is caused to rotate such that the roll paper 15 is transported (S20). When the leading end of the roll paper 15 reaches a position separated by a prescribed length from the cutter 27 on the downstream side in the transport direction B after the leading end passes the cutter 27, the cutter 27 is driven and the roll paper 15 is cut by the cutter 27 (S21). Here, the prescribed length is a length that satisfies a size of paper which is usable for the shading correction (described below).

The cut-off ledger sheet C is transported (S22) in the transport direction B in cooperation of the feed roller 22 with the idler roller 23, then through the joining section 29, and stopped at a position of the PLF 10. Then, the shading correction of the PLF 10 is performed (S23) using the ledger sheet C as a white reference board for the shading correction. After the completion of the shading correction, the flapper 28 is caused to rotate (S24) such that the insertion and discharge slit 2 and the collection storage 14 communicate with each other. Then, the ledger sheet C is recovered in the collection storage 14 (S25) in cooperation of the feed roller 6 with the idler roller 7. Then, the data stored in the shading target-counting portion 91 is updated (S26). For example, according to the embodiment, the data in the shading target-counting portion 91 is updated to "0." Then, the page information provided on the booklet P is acquired (S9), the booklet P is discharged from the insertion and discharge slit 2. When the user does not take out the booklet P, the booklet P is recovered in the collection storage 14. The description thereof is the same as above and thus is omitted.

As above, an example of bookkeeping in the booklet P is described. However, the process of the multifunction printer 1 does not necessarily print on the booklet P, and the ledger sheet as an account statement may be printed. Hereinafter, a case of printing on the ledger sheet is described with reference to FIG. 4.

When a process of printing on the roll paper 15 as the ledger sheet C is started (S31), the controller 50 determines whether or not shading correction of the PLF 10 of the multifunction printer 1 is performed (S32). Whether to perform the shading correction is determined using a formula stored in the shading correction implementation condition portion 90 and data stored in the shading target-counting portion 91. The controller 50 determines whether or not the shading correction is performed (S32). When it is determined that the shading correction is not performed (N in S32), the controller 50 receives print data which is to be printed on the roll paper 15 (S33). Then, the flapper 28 is caused to rotate (S34) and the second paper transport path 21 and the first paper transport path 5 are turned into a state of communicating with each other. Then, the feed roller 22 is caused to rotate such that the roll paper 15 is transported (S35) and reaches the second print unit 26. The printing is performed on the printing surface A17 of the roll paper 15 under the thermal print head 24 (S36). Then, the feed roller 22 is caused to rotate such that the roll paper 15 is transported (S37) and the roll paper 15 is cut in the cutter 27 (S38). The cut-off roll paper 15 is discharged from the insertion and discharge slit 2 as the ledger sheet C.

Then, in the multifunction printer 1, the feed roller 22 is caused to rotate and the ledger sheet C is conveyed on the insertion and discharge table 30, in cooperation with the idler roller 23. After the ledger sheet C is transported in the transport direction B to a position where a part thereof protrudes from the front surface 33 to the outside of the multifunction printer 1, the transport of the roll paper 15 is stopped (S39). Then, the multifunction printer 1 transports the ledger sheet C to the insertion and discharge slit 2 in the transport direction B and rotates the feed roller 22 and then transports, in cooperation with the idler roller 23, a portion of the roll paper 15 from which the sheet is cut off to a position on the upstream side of the second print unit 26 in the transport direction B (S40). This process is carried out because time for issuing the next ledger sheet is shortened by transporting the leading end of the roll paper 15 that is prepared for issuing the next ledger sheet C to the position on the upstream side of the second print unit 26 in the transport direction B.

The collection sensor 31, which is a transmission-type sensor, is provided in the insertion and discharge slit 2. When the transport of the ledger sheet C is stopped at the position where the part of the ledger sheet C protrudes from the front surface 33 to the outside of the multifunction printer 1, the collection sensor 31 detects that the ledger sheet C is present at the position and the timer 52 is started to perform time measurement (S41).

Then, the controller 50 determines whether the user takes out the ledger sheet C every fixed time (S42). When the controller 50 determines that the user takes out the ledger sheet C (Y in S42), the operation for the user ends (S43).

When it is determined that the user does not take out the ledger sheet C (N in S42), the controller 50 checks the period of time counted as the time measurement and determines whether the period of time exceeds a prescribed time period (S44).

When the prescribed time period does not elapse (N in S44), whether the ledger sheet C is taken out (S42) is determined again. When the prescribed time period elapses (Y in S44), the controller 50 first rotates the flapper 28 (S45). Accordingly, the insertion and discharge slit 2 and the collection storage 14 are turned into a state of communicating with each other. Then, the controller 50 causes the ledger sheet C to be recovered in the collection storage 14 in cooperation of the feed roller 6 with the idler roller 7 (S46) and the process ends (S43).

The controller 50 determines whether the shading correction is performed (S32). When 100 days elapse after the previous shading correction has been performed, the shading correction is determined to be performed (Y in S32). Thus, the flapper 28 is caused to rotate (S47) and the second paper transport path 21 and the first paper transport path 5 are turned into a state of communicating with each other. Then, the feed roller 22 is caused to rotate such that the roll paper 15 is transported (S48). When the leading end of the roll paper 15 reaches a position separated by a prescribed length from the cutter 27 on the downstream side in the transport direction B after the leading end passes the cutter 27, the cutter 27 is driven such that the roll paper 15 is cut off by the cutter 27 (S49).

The cut-off ledger sheet C is transported (S50) in the transport direction B in cooperation of the feed roller 22 with the idler roller 23, then through the joining section 29, and stopped at a position of the PLF 10. Then, the shading correction of the PLF 10 is performed (S51) using the ledger sheet C as a white reference board for the shading correction. After the completion of the shading correction, the flapper 28 is caused to rotate (S52) such that the insertion and discharge slit 2 and the collection storage 14 communicate with each other. Then, the ledger sheet C is recovered in the collection storage 14 (S53) in cooperation of the feed roller 6 with the idler roller 7. Then, the data stored in the shading target-counting portion 91 is updated (S54). Then, the receiving of the print data is performed (S33), the ledger sheet C is discharged from the insertion and discharge slit 2. When the user does not take out the ledger sheet C, the ledger sheet C is recovered in the collection storage 14. The description thereof is the same as above and thus is omitted. In this way, whichever the printing in the booklet P or the printing on the roll paper 15 is performed, it is possible to perform the shading correction at a right timing.

As described above, according to the first embodiment, whether to perform the shading correction is determined automatically and the roll paper used as the printing medium is also used as the white reference board for the shading correction. Accordingly, the multifunction printer 1 does not need to have a separate white reference board and a mechanism for moving the white reference board, and thus it is possible to decrease the size of the printer. In addition, the white reference board does not need to be prepared and kept separately, unlike a case where a user prepares a separate white reference board and inserts the white reference board from the outside of the printer when the shading correction is performed.

Second Embodiment

Figure 5:
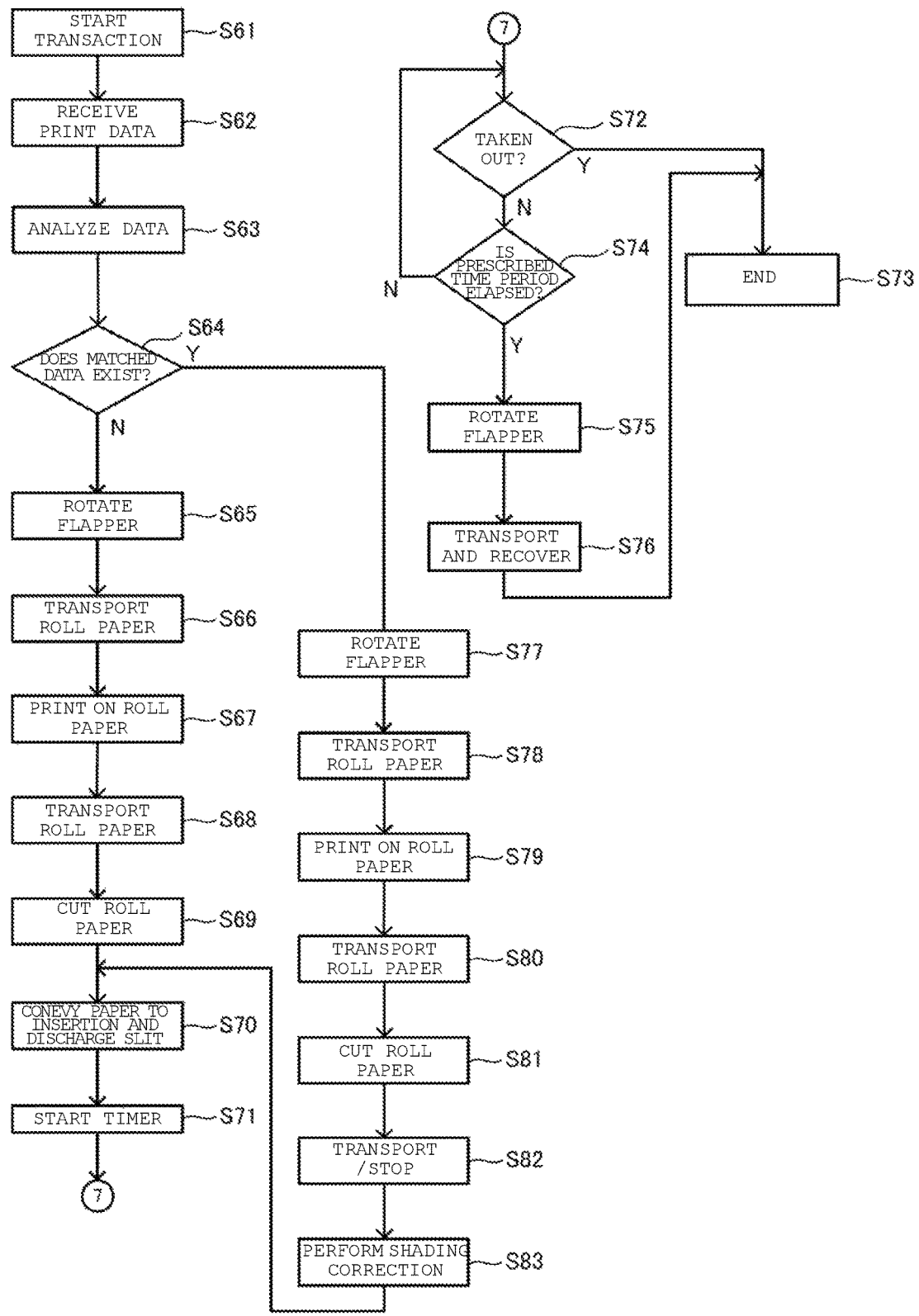
FIG. 5 is a flowchart of operations carried out in the printer according to a second embodiment.

Hereinafter, a printer according to the second embodiment will be described in detail with reference to FIG. 5. The detailed description of the same part of the configuration as that according to the first embodiment is omitted.

According to the first embodiment, during the shading correction, after the roll paper 15 to be used is cut off and is used as the white reference, and then the cut-off roll paper 15 is recovered in the collection storage 14 after the shading correction. However, the cut-off roll paper 15 recovered in the collection storage 14 is discarded and wasted. On the other hand, according to the second embodiment, the print data that is printed on the roll paper 15 is analyzed. Then, when there is a region of the roll paper 15 on which printing is not performed and which has a sufficient area to perform the shading correction, at a position corresponding to the position of the CCD image sensor of the PLF 10, the cut-off roll paper 15 is used also for the ledger sheet C as well as the white reference board for the shading correction.

According to the second embodiment, when the printing in the booklet P is performed, whether to perform the shading correction is not determined. When the printing on the roll paper 15 is performed, whether to perform the shading correction is determined.

When a process of issuing the ledger sheet C by printing on the roll paper 15 is started (S61), the controller 50 receives print data which is to be printed on the roll paper 15 (S62). Then, in the controller 50, a print data analyzing unit (not illustrated) provided in the ROM 53 analyzes whether there is a blank portion on which the printing is not performed and which has a sufficient area to perform the shading correction on an extended line from the CCD image sensor of the PLF 10 in the transport direction based on the received print data (S63). When the result of the analysis is that there is no blank area to perform the shading correction, that is, when it is determined that the data does not match a data with which the shading correction may be performed (N in S64), then the flapper 28 is caused to rotate (S65) and the second paper transport path 21 and the first paper transport path 5 are turned into a state of communicating with each other. Then, the feed roller 22 is caused to rotate such that the roll paper 15 is transported and reaches the second print unit 26 (S66). The printing is performed on the printing surface A17 of the roll paper 15 under the thermal print head 24 in accordance with the print data (S67). Then, the feed roller 22 is caused to rotate such that the roll paper 15 is transported (S68) and the roll paper 15 is cut in the cutter 27 (S69). The cut roll paper 15 is discharged from insertion and discharge slit 2 as the ledger sheet C.

Then, in the multifunction printer 1, the feed roller 22 is caused to rotate and the ledger sheet C to be placed on the insertion and discharge table 30, in cooperation with the idler roller 23. After the ledger sheet C is transported in the transport direction B to a position where a part thereof protrudes from the front surface 33 to the outside of the multifunction printer 1, the transport of the roll paper 15 is stopped (S70). Then, the multifunction printer 1 transports the ledger sheet C to the insertion and discharge slit 2 in the transport direction B and rotates the feed roller 22 and then transports, in cooperation with the idler roller 23, a portion of the roll paper 15 from which the ledger sheet C is cut off to a position on the upstream side of the second print unit 26 in the transport direction B. This process is carried out because time for issuing the next ledger sheet is shortened by transporting the leading end of the roll paper 15 that is prepared for issuing the next ledger sheet C to the position on the upstream side of the second print unit 26 in the transport direction B.

The collection sensor 31, which is a transmission-type sensor, is provided in the insertion and discharge slit 2. When the transport of the ledger sheet C is stopped at the position where the part of the ledger sheet C protrudes from the front surface 33 to the outside of the multifunction printer 1, the collection sensor 31 detects that the ledger sheet C is present at the position and the timer 52 is started to perform time measurement (S71).

Then, the controller 50 determines whether the user takes out the ledger sheet C every fixed time (S72). When the controller 50 determines that the user takes out the ledger sheet C (Y in S72), the operation for the user ends (S73).

When it is determined that the user does not take out the ledger sheet C (N in S72), the controller 50 checks the period of time counted as the time measurement and determines whether the period of time exceeds a prescribed time period (S74).

When the prescribed time period does not elapse (N in S74), whether the ledger sheet C is taken out (S72) is determined again. When the prescribed time period elapses (Y in S74), the controller 50 first rotates the flapper 28 (S75). Accordingly, the insertion and discharge slit 2 and the collection storage 14 are in a state of communicating with each other. Then, the controller 50 causes the ledger sheet C to be recovered in the collection storage 14 in cooperation of the feed roller 6 with the idler roller 7 (S76) and the process ends (S73).

When the print data is analyzed (S63) and it is determined that the data matches a data with which the shading correction may be performed (Y in S64), then the flapper 28 is caused to rotate (S77) and the second paper transport path 21 and the first paper transport path 5 are turned into a state of communicating with each other. Then, the feed roller 22 is caused to rotate such that the roll paper 15 is transported (S78) and reaches the second print unit 26. The printing is performed on the printing surface A17 of the roll paper 15 under the thermal print head 24 in accordance with the print data (S79). Then, the feed roller 22 is caused to rotate such that the roll paper 15 is transported (S80), and then the roll paper 15 is cut off by the cutter 27 (S81). Then, the controller 50 rotates the feed roller 22 and the feed roller 6 such that the roll paper 15 cut off by the cutter 27, i.e., the ledger sheet C, is transported in the transport direction B. The controller 50 stops the blank portion in the ledger sheet C, with which the shading correction may be performed, at a position which matches a detection position of the CCD image sensor of the PLF 10 (S82), and then the shading correction is performed (S83). The transported ledger sheet C is conveyed to the insertion and discharge slit 2 to be handed to the user. When the user forgets to take out the ledger sheet C, the ledger sheet C is recovered in the collection storage 14. Such types of control are the same as above and thus, the description thereof is omitted.

As described above, according to the second embodiment, when the printing is performed on a portion of the roll paper 15 that is cut off as the ledger sheet C, the print data for the printing is analyzed. When a blank with which the shading correction may be performed is determined to be included in the ledger sheet based on the print data, the shading correction of the CCD image sensor is performed using the ledger sheet. As the multifunction printer 1 does not need to include a separate white reference board and a mechanism for moving the white reference board, it is possible to decrease the size of the printer. In addition, the white reference board does not need to be prepared and kept separately, unlike a case where a user prepares a separate white reference board and inserts the white reference board from the outside of the printer when the shading correction is performed. In addition, since the ledger sheet which is issued and handed to the user is also used as the white reference board, there is no recovered paper. Thus, no paper is wasted, unlike a case of recovering a cut-off sheet on which no printing is performed is used as the white reference board.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing apparatus comprising:
   a discharge opening;
   a printer disposed along a sheet conveyance path extending from the discharge opening and configured to print an image on a sheet while the sheet is conveyed towards the discharge opening therethrough;
   a scanner disposed along the sheet conveying path between the discharge opening and the printer, and configured to scan a sheet surface; and
   a controller configured to perform a shading correction of the scanner using the sheet as a white reference without printing the image on the sheet with the printer.

2. The printing apparatus according to claim 1, further comprising:
   a container, wherein
   the controller is further configured to cause the sheet used as the white reference for the shading correction to be conveyed to the container.

3. The printing apparatus according to claim 1, further comprising:
   a container, wherein
   the container is disposed farther from the discharge opening than the printer along the sheet conveyance path.

4. The printing apparatus according to claim 1, wherein
   the controller is further configured to cause the sheet used as the white reference for the shading correction to be conveyed to the discharge opening.

5. The printing apparatus according to claim 4, further comprising:
   a container, wherein
   the controller is further configured to start counting time when the sheet is conveyed to the discharge opening, and start sheet conveyance to the container when the sheet has not been taken out at timing when the counted time reaches a reference time.

6. The printing apparatus according to claim 1, wherein the controller is further configured to determine whether to perform the shading correction based on timing of a previous shading correction.

7. The printing apparatus according to claim 6, wherein the controller determines whether to perform the shading correction before the sheet reaches the printer, when the sheet is conveyed to the printer for printing.

8. The printing apparatus according to claim 1, wherein the shading correction is performed using a region of the sheet on which no image is printed, as the white reference.

9. The printing apparatus according to claim 1, wherein the printer is a thermal printer.

10. The printing apparatus according to claim 1, further comprising:
   a cutter disposed to cut an unwound portion of a roll sheet, wherein
   the unwound portion of the roll sheet is conveyed to the scanner as the sheet.

11. A method for operating a printing apparatus including a discharge opening, a printer disposed along a sheet conveyance path extending from the discharge opening, and a scanner disposed along the sheet conveying path between the discharge opening and the printer and configured to scan a sheet surface, the method comprising:
   conveying a sheet to the scanner through the printer; and
   performing a shading correction of the scanner using the sheet as a white reference without printing an image on the sheet with the printer.

12. The method according to claim 11, further comprising:
   conveying the sheet to a container of the printer after the shading correction ends.

13. The method according to claim 11, wherein
   the printing apparatus further includes a container, and
   the container is disposed farther from the discharge opening than the printer along the sheet conveyance path.

14. The method according to claim 11, further comprising:
   conveying the sheet to the discharge opening after the shading correction ends.

15. The method according to claim 14, further comprising:
   starting to count time when the sheet is conveyed to the discharge opening, and
   conveying the sheet to a container of the printer when the sheet as not been taken out at timing when the counted time reaches a reference time.

16. The method according to claim 11, further comprising:
   determining whether to perform the shading correction based on timing of a previous shading correction, wherein
   the shading correction is performed based on the determination.

17. The method according to claim 16, further comprising:
   the determining is carried out before the sheet is conveyed to the printer.

18. The method according to claim 11, wherein
   the shading correction is performed using a region of the sheet on which no image is printed, as the white reference.

19. The method according to claim 11, wherein
   the printer is a thermal printing unit.

20. The method according to claim 11, further comprising:
   cutting an unwound portion of a roll sheet, wherein the unwound portion of the roll sheet is conveyed to the scanner as the sheet.

* * * * *